United States Patent
Almukhtar

(10) Patent No.: US 12,445,055 B2
(45) Date of Patent: Oct. 14, 2025

(54) LOW POWER GREEN MODE FOR MULTI-PHASE POWER CONVERTERS

(71) Applicant: SEMICONDUCTOR COMPONENTS INDUSTRIES, LLC, Scottsdale, AZ (US)

(72) Inventor: Basil Almukhtar, Dooradoyle (IE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 341 days.

(21) Appl. No.: 18/300,646

(22) Filed: Apr. 14, 2023

(65) Prior Publication Data
US 2024/0348142 A1    Oct. 17, 2024

(51) Int. Cl.
*H02M 3/158*    (2006.01)
*H02M 1/00*     (2007.01)
*H02M 3/157*    (2006.01)

(52) U.S. Cl.
CPC ....... *H02M 3/1584* (2013.01); *H02M 1/0032* (2021.05); *H02M 1/0041* (2021.05); *H02M 3/157* (2013.01)

(58) Field of Classification Search
None
See application file for complete search history.

(56) References Cited

U.S. PATENT DOCUMENTS

| | | | | |
|---|---|---|---|---|
| 8,080,987 B1 * | 12/2011 | Qiu | ...... | H02M 3/156 323/284 |
| 9,882,474 B2 * | 1/2018 | Schmitz | ...... | H02M 3/157 |
| 10,498,237 B1 * | 12/2019 | Lin | ...... | H02M 3/158 |
| 11,251,703 B2 * | 2/2022 | Lynch | ...... | H02M 3/158 |
| 2015/0357913 A1 * | 12/2015 | Tschirhart | ...... | H02M 3/156 323/282 |
| 2016/0261183 A1 * | 9/2016 | Kelly | ...... | H02M 3/1563 |

OTHER PUBLICATIONS

Z. Shaowei et al, "A digitally controlled PWM/PSM dual-mode DC/DC converter," Journal of Semiconductors, vol. 32, No. 11, Nov. 2011 (Year: 2011).*

K.Y. Cheng et al., "Digital Enhanced V-2-Type Constant On-Time Control Using Inductor Current Ramp Estimation for a Buck Converter With Low-ESR Capacitors," IEEE Explore, vol. 28 No. 3, Mar. 2013 (Year: 2013).*

* cited by examiner

*Primary Examiner* — Sean Kayes
*Assistant Examiner* — Jennifer C Caulk
(74) *Attorney, Agent, or Firm* — Polansky & Associates, P.L.L.C.; Paul J. Polansky

(57) ABSTRACT

A multi-phase power converter includes a digital ramp pulse modulation controller, a digital constant on-time controller, and a driver stage. The digital ramp pulse modulation controller provides a trigger ramp signal in response to an error signal when the multi-phase power converter is not in a green mode, wherein at least a portion of the digital ramp pulse modulation controller is inactive in the green mode. The digital constant on-time controller provides on-time thresholds and off-time thresholds when the multi-phase power converter is in the green mode. The driver stage provides a plurality of drive signals to a corresponding plurality of power stages in response to the trigger ramp signal when the multi-phase power converter is not in the green mode and to the on-time thresholds and the off-time thresholds when the multi-phase power converter is in the green mode.

20 Claims, 6 Drawing Sheets

LOW POWER GREEN MODE FOR MULTI-PHASE POWER CONVERTERS

FIELD OF THE DISCLOSURE

This disclosure relates generally to power converters, and more specifically to multi-phase power converters with low-power modes.

BACKGROUND

Switched mode power supplies can be used to create a direct current (DC) voltage from an alternating current (AC) voltage by switching current through energy storage elements such as inductors. The duty cycle of the switching is controlled to regulate the output voltage to a desired level. Switched mode power converters are widely used for their higher efficiency However, switched mode power supplies are generally efficient at heavier loads but less efficient at lighter loads.

A common topology is known as a buck converter and converts a higher voltage such as a rectified AC line voltage into a lower DC voltage. Modern switched mode power converters are digitally controlled, because they have lot of advantages in terms of programmability, noise robustness, and the availability of advanced control methods. Due to a digital controller's discrete nature, it can suffer from large loop latency, compromising its stability and dynamic performance. This problem can be overcome by means of higher sampling rates, but digital controllers with higher and possibly overclocked sampling rates suffer from higher power loss, which has a bigger percentage impact on efficiency at lighter load conditions.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well. The following Detailed Description is directed to electronic circuitry, and the description of a block shown in a drawing figure implies the implementation of the described function using suitable electronic circuitry, unless otherwise noted.

DETAILED DESCRIPTION

Figure 1:
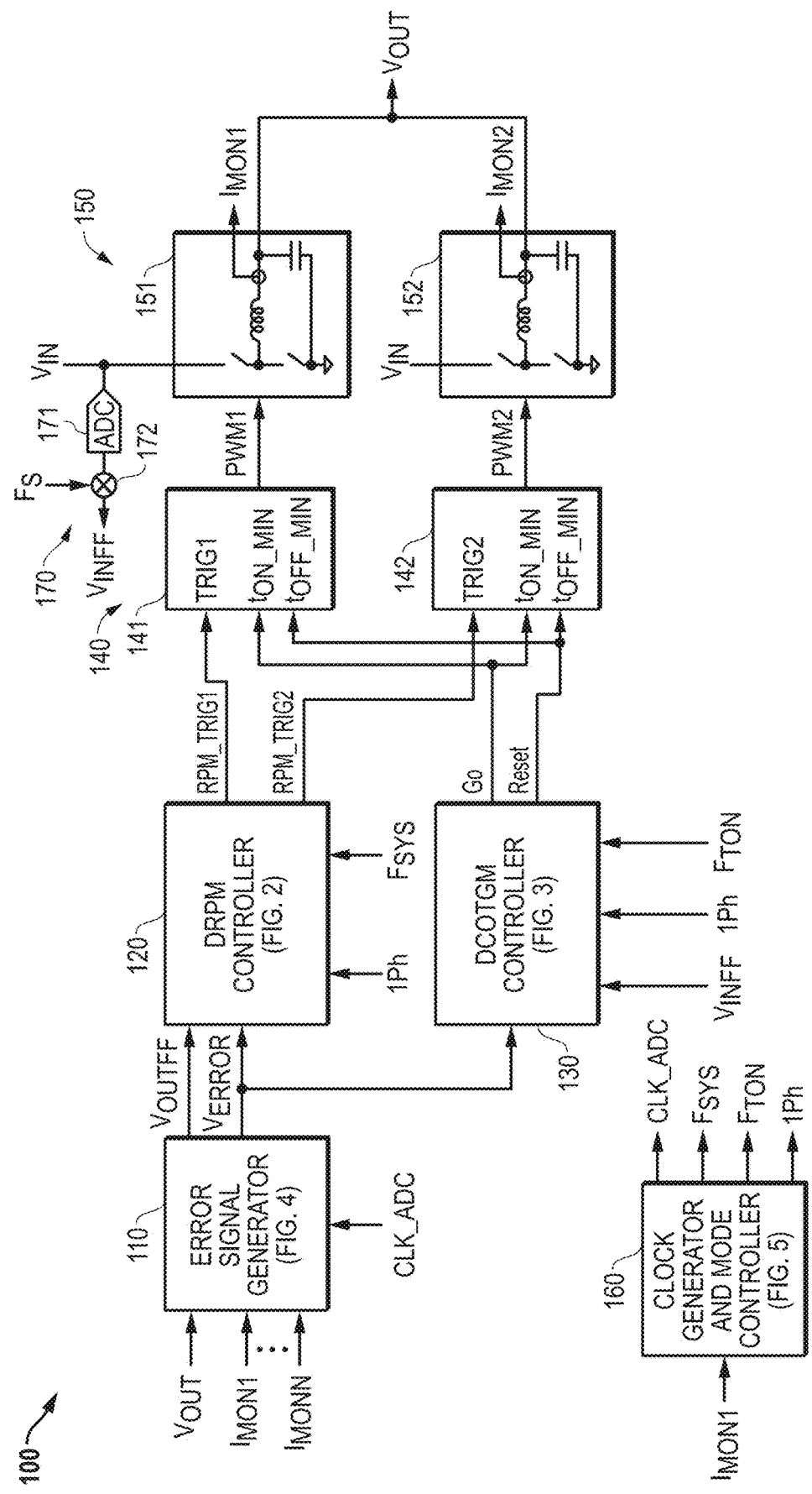
FIG. 1 illustrates in partial block diagram and partial schematic a multi-phase power converter according to various embodiments of the present disclosure.

FIG. 1 illustrates in partial block diagram and partial schematic a multi-phase power converter 100 according to various embodiments of the present disclosure. Multi-phase power converter 100 includes generally an error signal generator 110, a digital ramp pulse modulation controller 120 labelled "DPRM CONTROLLER", a digital constant on-time/green mode controller 130 labelled "DCOTGM CONTOLLER", a driver stage 140, power stages 150, and a clock generator and mode controller 160.

Error signal generator 110 has an input for receiving an output voltage labelled "$V_{OUT}$", inputs for receiving a set of monitored current signals labelled "$I_{MON1}$" through "$I_{MONN}$", an output for providing a feed-forward output voltage labelled "$V_{OUTFF}$", and an output for providing an error signal labelled "$V_{ERROR}$". An implementation of error signal generator 110 that is suitable for use in multi-phase power converter 100 is described below with reference to FIG. 4.

Digital ramp pulse modulation controller 120 has an input for receiving the $V_{OUTFF}$ voltage, an input for receiving the $V_{ERROR}$ signal, an input for receiving a control signal labelled "1Ph", an input for receiving a clock signal labelled "$F_{SYS}$", and first and second outputs for providing two trigger signals and including a first trigger signal labelled "RPM_TRIG1" and a second trigger signal labelled "RPM_TRIG2", respectively. An implementation of digital ramp pulse modulation controller 120 that is suitable for use in multi-phase power converter 100 is described below with reference to FIG. 2.

Digital constant on-time/green mode controller 130 has an input for receiving the $V_{ERROR}$ signal, an input for receiving a feed-forward input voltage labelled "$V_{INFF}$", an input for receiving a signal labelled "1Ph", an input for receiving a constant on-time control signal labelled "$F_{TON}$", a first output labelled "Go", and a second output labelled "Reset". An implementation of digital constant on-time/green mode controller 130 that is suitable for use in multi-phase power converter 100 is described below with reference to FIG. 3.

Driver stage 140 includes a driver 141 and a driver 142. Driver 141 has an input labelled "TRIG1" connected to the first output of digital ramp pulse modulation controller 120 for receiving the RPM_TRIG1 signal, a second input labelled "$t_{ON\_MIN}$" connected to the first output of digital constant on-time/green mode controller 130 for receiving the Go signal, a third input labelled "$t_{OFF\_MIN}$" connected to the second output of digital constant on-time/green mode controller 130 for receiving the Reset signal, and an output for providing a signal labelled "PWM1". Driver 142 has an input labelled "TRIG2" connected to the second output of digital ramp pulse modulation controller 120 for receiving the RPM_TRIG2 signal, a second input labelled "$t_{ON\_MIN}$" connected to the first output of digital constant on-time/green mode controller 130 for receiving the Go signal, a third input labelled "$t_{OFF\_MIN}$" connected to the second output of digital constant on-time/green mode controller 130 for receiving the Reset signal, and an output for providing a signal labelled "PWM2".

Power stages 150 includes a power stage 151 and a power stage 152. Power stage 151 has an input for receiving a power supply voltage labelled "$V_{IN}$", a control input connected to the output of driver 141 for receiving the PWM1 signal, a current monitor output for providing the $I_{MON1}$ signal, and a voltage output for providing $V_{OUT}$ to a load, not shown in FIG. 1. Power stage 152 has an input for receiving power supply voltage $V_{IN}$, a control input connected to the output of driver 142 for receiving the PWM2 signal, a current monitor output for providing a signal labelled "$I_{MON2}$", and a voltage output connected to the output of power stage 151 for providing $V_{OUT}$. As shown in FIG. 1, multi-phase power converter 100 has a buck architecture in which $V_{OUT}$ is regulated to a voltage less than the nominal voltage of $V_{IN}$ using a set of identically constructed power stages. Each power stage has high- and low-side switches at the input of an inductor, and monitors the current flowing through the particular branch into the load to generate a corresponding $I_{MON}$ signal.

Clock generator and mode controller 160 is a control signal generator that has an input for receiving the $I_{MON1}$ signal, a first output for providing a signal labelled "CLK_ADC", a second output for providing the $F_{SYS}$ signal, a third output for providing the $F_{TON}$ signal, and a fourth output for providing the 1Ph signal. An implementation of clock generator and mode controller 160 that is suitable for use in multi-phase power converter 100 is described below with reference to FIG. 5.

An input voltage feed-forward circuit 170 includes an analog-to-digital converter 171 and a multiplier 172. Analog-to-digital converter 171 has an input for receiving $V_{IN}$, and an output. Multipler 172 has a first input for receiving a scaling signal labelled "Fs", a second input connected to the output of multiplier 171, and an output for providing the $V_{INFF}$ signal to the first input of DCOTGM controller 130.

In operation, digital ramp pulse modulation controller 120 provides a trigger ramp signal in response to $V_{ERROR}$ when multi-phase power converter 100 is not in a green mode, while digital ramp pulse modulation controller 120 is inactive in the green mode. Digital constant on-time/green mode controller 130 provides off-time thresholds for both driver 141 and driver 142 when multi-phase power converter 100 is not in the green mode, and on- and off-time thresholds for driver 141 when multi-phase power converter 100 is in the green mode. Driver stage 140 provides multiple drive signals to a corresponding plurality of power stages in response to the trigger ramp signal when the multi-phase power converter is not in the green mode, and in response to the on-time thresholds and the off-time thresholds to a single power stage 151 when the multi-phase power converter is in the green mode. In this way, multi-phase power converter 100 is able to maintain $V_{OUT}$ at the desired level under light load conditions while providing excellent converter efficiency.

Figure 2:
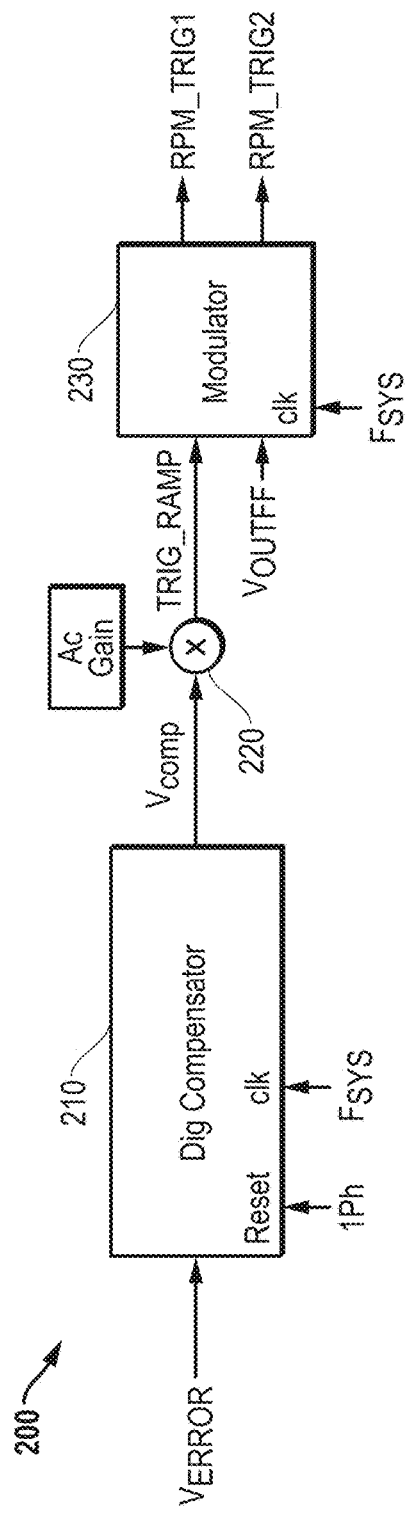
FIG. 2 illustrates in block diagram form a digital pulse ramp modulation controller suitable for use as the digital pulse ramp modulation controller of FIG. 1.

FIG. 2 illustrates in block diagram form a digital pulse ramp modulation controller 200 suitable for use as digital ramp pulse modulation controller 120 of FIG. 1. Digital pulse ramp modulation controller 200 includes generally a digital compensator 210, a multiplier 220, and a modulator 230. Digital compensator 210 has an input for receiving the $V_{ERROR}$ signal, a reset input for receiving the 1Ph signal, a clock input for receiving the $F_{SYS}$ clock signal, and an output for providing a compensation signal labelled "$V_{comp}$". Multiplier 220 has a first input for receiving the $V_{comp}$ signal, a second input for receiving a value labelled "Ac Gain", and an output for providing a trigger ramp signal labelled "TRIG_RAMP". Modulator 230 has a first input connected to the output of multiplier 220, a second input for receiving the $V_{OUTFF}$ signal, a clock input for receiving the $F_{SYS}$ cock signal, and an output for providing the RPM_TRG signals.

Digital compensator 210 is a digital circuit that forms a compensated error signal Vcomp in response to the $V_{ERROR}$ signal and evaluates it synchronously according to the $F_{SYS}$ clock signal. For example, it performs leading edge blanking to compensate $V_{ERROR}$ at the beginning of the on-time. It provides the $V_{comp}$ signal as a digital signal synchronously with respect to the $F_{SYS}$ clock signal. Multiplier 220 multiplies the $V_{comp}$ signal by the Ac Gain signal to provide the TRIG_RAMP input to modulator 230. The Ac Gain signal is a signal that accounts for the level of $V_{IN}$ according to the AC input voltage of an earlier stage, e.g., a rectification stage. Modulator 230 operates synchronously with the $F_{SYS}$ clock signal and outputs the RPM_TRIG signals by comparing the TRIG_RAMP signal at the output of multiplier 220 to the feed-forward $V_{OUT}$ ($V_{OUTFF}$) level. RPM_TRIG signals are digital signals that establish the on time of the active phases of multi-phase power converter 100.

Figure 3:
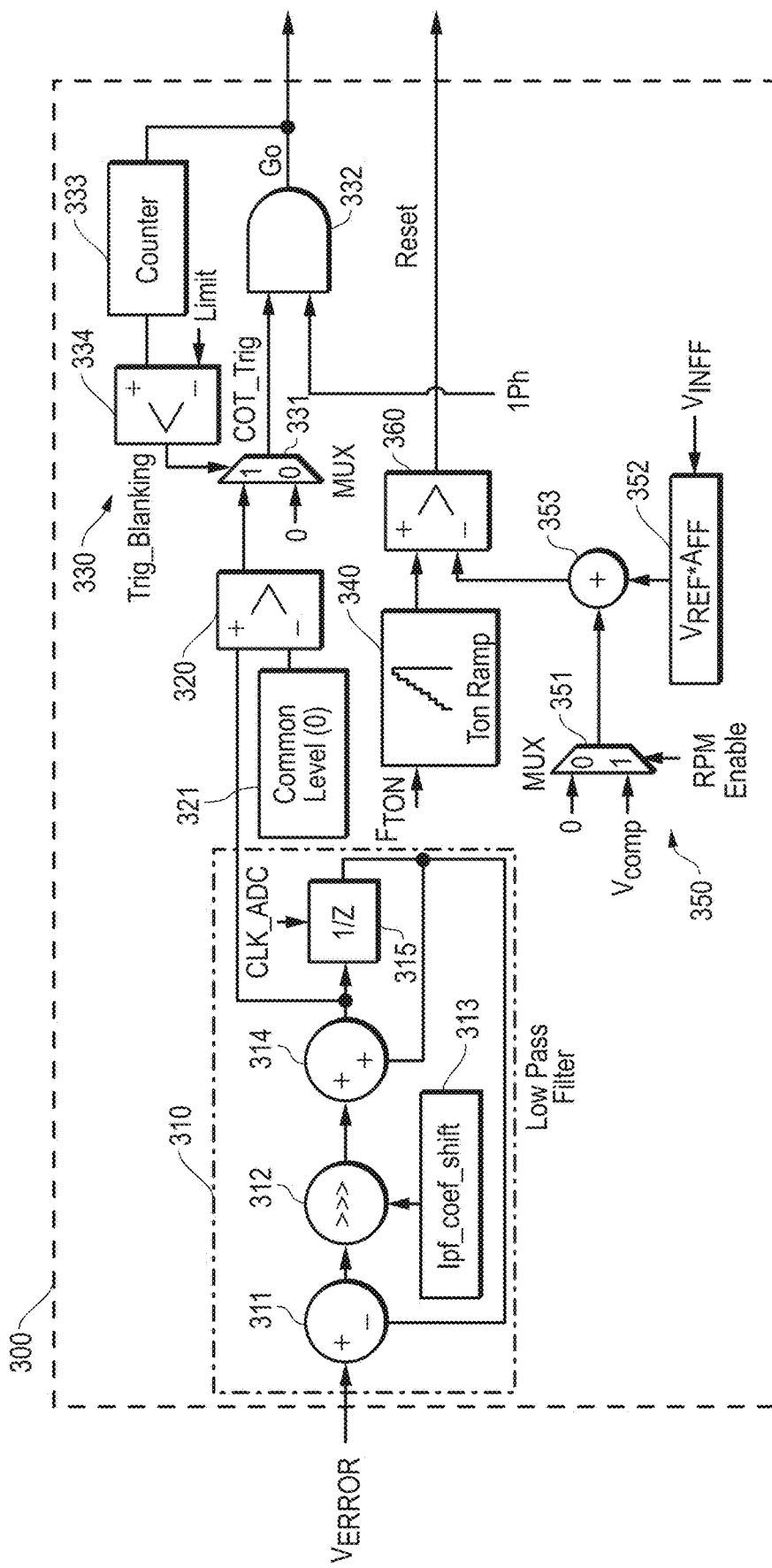
FIG. 3 illustrates in block diagram form a digital constant on-time/green mode controller suitable for use as the digital constant on-time/green mode controller of FIG. 1.

FIG. 3 illustrates in block diagram form a digital constant on-time/green mode controller 300 suitable for use as digital constant on-time/green mode controller 130 of FIG. 1. It includes generally a lowpass filter 310, a comparator 320 and an associated register 321, a trigger generator 330, a ramp generator 340, a ramp compare level generator 350, and a comparator 360.

Lowpass filter 310 is a digital lowpass filter including a summing device 311, a shift register 312, a coefficient register 313, a summing device 314, and a delay element 315. Summing device 311 has a positive input for receiving the $V_{ERROR}$ signal, a negative input, and an output. Shift register 312 has an input connected to the output of summing device 311, a shift input, and an output. Register 313 has an output connected to the shift input of shift register 312 and stores a value labelled "lpf_coef_shift". Summing device 314 has a first positive input connected to the output of shift register 312, a second positive input, and an output. Delay element 315 is labelled "1/Z" and has an input connected to the output of summing device 314, a clock input for receiving the CLK_ADC signal, and an output connected to the negative input of summing device 311 and to the second positive input of summing device 314.

Comparator 320 has a positive input connected to the output of summing device 314, a negative input, and an output. Register 321 has an output connected to the negative input of comparator 320 for providing a value labelled "Common Level (0)".

Trigger generator 330 includes a multiplexer 331 labelled "MUX", an AND gate 332, a counter 333, and a comparator 334. Multiplexer 331 has a first input labelled "0" for receiving a digital zero level, a second input labelled "1" connected to the output of comparator 320, a control input, and an output for providing a signal labelled "COT_Trig". AND gate 332 has a first input connected to the output of multiplexer 331, a second input for receiving the 1Ph signal, and an output for providing a signal labelled "Go". Counter 333 has an input connected to the output of AND gate 332, and an output. Comparator 334 has a positive input connected to the output of counter 333, a negative input for receiving a signal labelled "Limit", and an output connected to the control input of multiplexer 331 for providing a signal labelled "Trig_Blanking".

Ramp generator 340 has an input for receiving the $F_{TON}$ signal, and an output for providing an on-time ramp signal that will be explained further below.

Ramp compare level generator 350 includes a multiplexer 351 labelled "MUX", a multiplier block 352, and a summing device 353. Multiplexer 351 has a first input labelled "0" for receiving a digital zero level, a second input labelled "1" for receiving the Vcomp signal, a control input for receiving a signal labelled "RPM Enable", and an output. Multiplier 352 has an input for receiving the $V_{INFF}$ voltage, and an output. Summing device 353 has a first positive input connected to the output of multiplexer 351, a second positive input connected to the output of multiplier 352, and an output.

Comparator 360 has a positive input connected to the output of ramp generator 340, a negative input connected to the output of summing device 353, and an output for providing a signal labelled "Reset".

Figure 4:
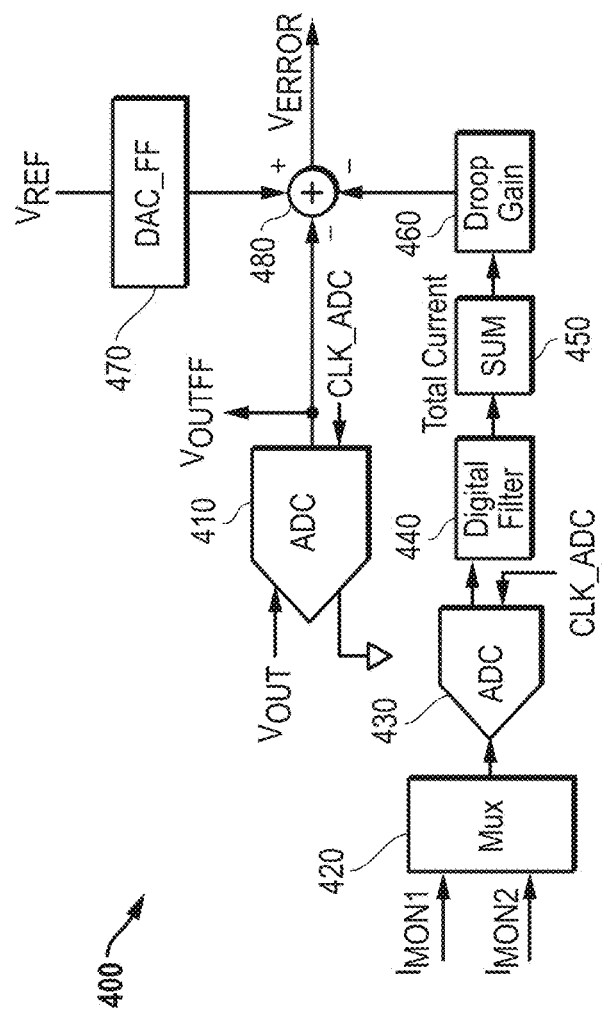
FIG. 4 illustrates in block diagram form an error signal generator suitable for use as the error signal generator of FIG. 1.

FIG. 4 illustrates in block diagram form an error signal generator 400 suitable for use as error signal generator 110 of FIG. 1. Error signal generator 400 includes an analog-to-digital converter 410 labelled "ADC", a multiplexer 420, an analog-to-digital converter 430, a digital filter 440, a summing device 450, a droop gain circuit 460, a digital-to-analog converter 470 labelled "DAC_FF", and a summing device 480. Analog-to-digital converter 410 has a positive input for receiving $V_{OUT}$, a negative input for receiving a ground voltage, a clock input for receiving the CLK_ADC signal, and an output for providing the $V_{OUTFF}$ signal. Multiplexer 420 has a first input for receiving signal $I_{MON1}$, a second input for receiving signal $I_{MON2}$, and an output. Analog-to-digital converter 430 has an input connected to the output of multiplexer 420, a clock input for receiving the CLK_ADC signal, and an output. Digital filter 440 has an input connected to the output of analog-to-digital converter 430, and an output. Summing device 450 has an input connected to the output of digital filter 440, and an output. Droop gain circuit 460 has an input connected to the output of summing device 450, and an output. Digital-to-analog converter 470 has an input for receiving a reference voltage "$V_{REF}$", and an output. Summing device 480 has a positive input connected to the output of digital-to-analog converter 470, a first negative input connected to the output of analog-to-digital converter 410, a second negative input connected to the output of droop gain circuit 460, and an output for providing the $V_{ERROR}$ signal.

Figure 5:
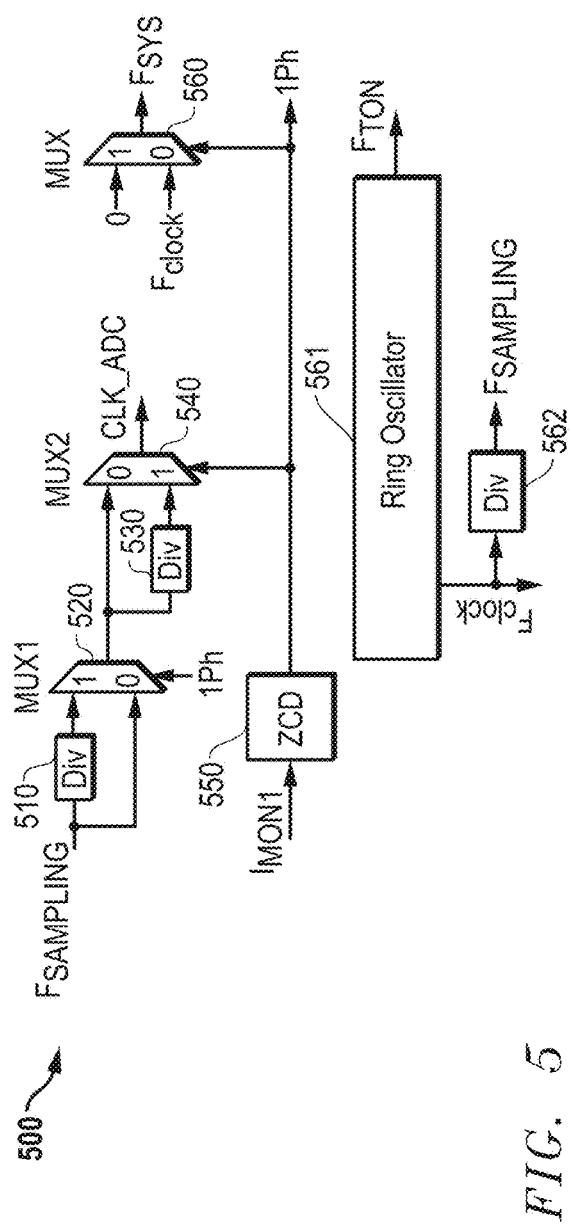
FIG. 5 illustrates in block diagram form a clock generator and mode controller suitable for use as the clock generator and mode controller of FIG. 1.

FIG. 5 illustrates in block diagram form a clock generator and mode controller 500 suitable for use as clock generator and mode controller 160 of FIG. 1. Clock generator and mode controller 500 includes a divider 510, a multiplexer 520 labelled "MUX1", a divider 530, a multiplexer 540 labelled "MUX2", a zero current detection circuit 550, a multiplexer 560 labelled "MUX", a ring oscillator 561, and a multiplexer 562. Divider 510 has an input for receiving a sample clock signal labelled "$F_{SAMPLING}$", and an output. Multiplexer 520 has a first input labelled "0" for receiving the $F_{SAMPLING}$ signal, a second input labelled "1" connected to the output of divider 510, a control input for receiving the 1Ph signal, and an output. Divider 530 has an input connected to the output of multiplexer 520, and an output. Multiplexer 540 has a first input labelled "0" connected to the output of multiplexer 520, a second input labelled "1" connected to the output of divider 530, a control input, and an output for providing the CLK_ADC signal. Zero current detection circuit 550 has an input for receiving the $I_{MON1}$ signal, and an output connected to the control input of multiplexer 540 for providing the 1Ph signal. Multiplexer 560 has a first input labelled "0" for receiving a signal labelled "$F_{clock}$", a second input labelled "1" for receiving a digital zero level, a control input for receiving the 1Ph signal, and an output for providing the $F_{SYS}$ signal. Ring oscillator 561 has a first output for providing the $F_{clock}$ signal, and a second output for providing the $F_{TON}$ signal. Divider 562 has an input for receiving the $F_{clock}$ signal, and an output for providing the $F_{SAMPLING}$ signal.

Clock generator and mode controller 500 performs three functions. First, it generates clock signals for use in multi-phase power converter 100. Ring oscillator 561 generates the $F_{clock}$ signal, which serves as the root clock for several other clocks in multi-phase power converter 100. Divider 562 divides the $F_{clock}$ signal to provide the $F_{SAMPLING}$ signal, which serves as the root clock for the operation of digital constant on-time/green mode controller 300. It also generates the $F_{TON}$ clock signal that is used to establish the on-time for multi-phase power converter 100 when it operates in green mode.

Second, it determines the sample rate for digital constant on-time/green mode controller 300. When in green mode, the 1Ph signal is at a logic high, causing multiplexer 520 to select the "1" input, i.e., the divided clock signal. Second, it determines whether the load has lightened so much that the single phase is in discontinuous conduction mode. If so, zero current detection circuit 550 activates the 1Ph=signal at a logic high in response to zero current detection in power stage 151, representing discontinuous conduction mode. The activation of the 1Ph signal causes multiplexer 540 to select the "1" input, and causing the divided sample clock to be further divided by divider 530 to provide the CLK_ADC signal to be further divided. In this way, it slows down the operation of the sample error signal generator such that multi-phase power converter 100 operates even more efficiently under very light load conditions.

Third, it generates the $F_{SYS}$ clock used to drive digital compensator 210. When not in green mode, 1Ph=0, and multiplexer 560 provides $F_{SYS}=F_{clock}$ and drives digital compensator 210 at its full frequency. When in green mode, 1Ph=1, and multiplexer 560 drives the $F_{SYS}$ clock to 0, effectively disabling the operation of digital compensator 210 and saving the high operating power it consumes.

It should be apparent that the particular circuits shown in FIG. 5 are sufficient to generate the clock signals appropriately for both normal mode and green mode. However, other implementations of these circuits are possible in other embodiments.

Figure 6:
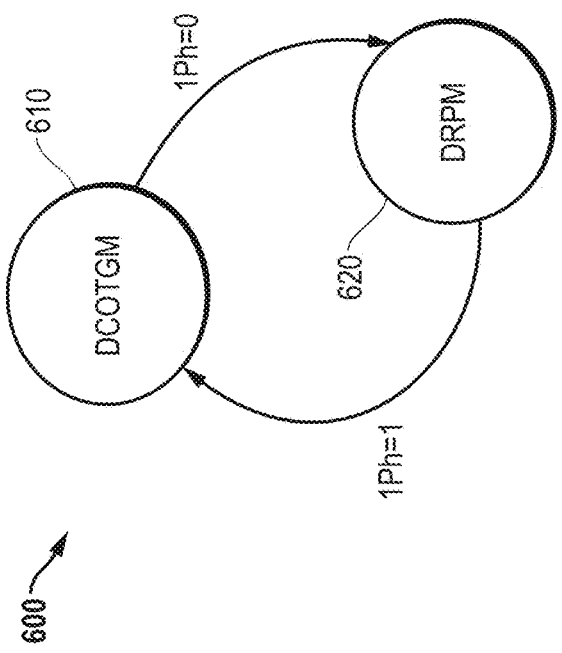
FIG. 6 illustrates a state diagram showing the operation of the multi-phase power converter of FIG. 1.

FIG. 6 illustrates a state diagram 600 showing the operation of multi-phase power converter 100 of FIG. 1. State diagram 600 includes a state 610 is labelled "DCOTGM" and corresponds to operation in the green mode, and a state 620 labelled "DRPM" that corresponds to operation in the normal mode. When multi-phase power converter 100 is relatively heavily loaded, the 1Ph signal is inactive at a logic low, e.g., the 0 state, signifying that more than one phase is active, and the state transitions into state 620. In state 620, multi-phase power converter 100 provides high power delivery based on a relatively high load demand. When the load subsequently lightens such that only one phase is active, the 1Ph signal is active at a logic high, e.g., the 1 state, and the state transitions into state 610. In state 610, multi-phase power converter 100 operates with high efficiency based on a relatively low load demand. It provides the high efficiency by lowering the sampling rate, turning off digital compensator 210, and turning off the trigger ramp. In this way, multi-phase power converter 100 is able to retain high efficiency in the green mode even under very light load conditions.

Figure 7:
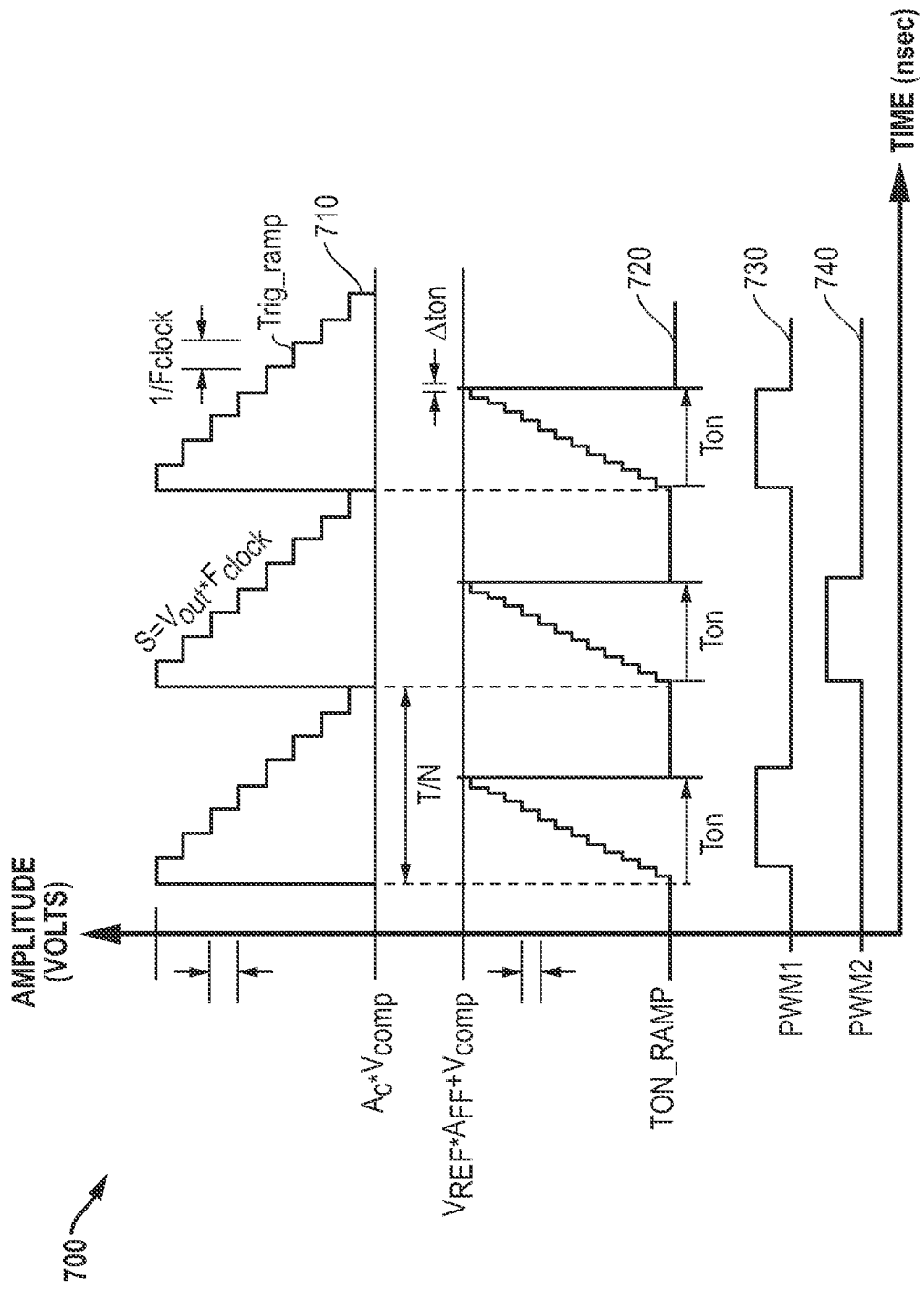
FIG. 7 illustrates a timing diagram showing the operation of the multi-phase power converter of FIG. 1.

FIG. 7 illustrates a timing diagram 700 showing the operation of multi-phase power converter 100 of FIG. 1. In timing diagram 700, the horizontal axis shows time in nanoseconds (ns), and the vertical axis shows the amplitude of various signals in volts. Shown in FIG. 7 are waveforms of four signals of interest, including a waveform 710 of the TRIG_RAMP signal, a waveform 720, a waveform 730 showing the PWM signal provided from driver 141 to power stage 151, and a waveform 740 showing the PWM signal provided from driver 142 to power stage 152.

Timing diagram 700 shows the condition in which multi-phase power converter 100 is operating in the normal mode, corresponding to state 620. Multi-phase power converter 100 clocks ADC 430 at a high frequency using the $I_{MON}$ signals from all active phases to adjust the $V_{OUT}$ signal to provide $V_{ERROR}$, and clocks digital compensator 210 clock at a high $F_{sample}$ speed to generate $V_{comp}$. It uses the TRIG_RAMP signal for PWM leading-edge modulation, and the TON_RAMP signal for trailing-edge modulation. The output of driver 141, i.e., PWM1, is set by the trigger ramp inception which in turn is formed by the value of $V_{COMP}$, and is reset by the TON_RAMP reaching the $V_{REF}*A_{FF}+V_{COMP}$ value. On the alternate cycle, when two phases are active, the output of driver 142, i.e., PWM2, is set in the same manner, by the trigger ramp inception which in turn is formed by the value of $V_{COMP}$, and is reset by the TON_RAMP reaching the $V_{REF}*A_{FF}+V_{COMP}$ value. DPRM operation is useful for delivering high-power under heavy load conditions, but suffers from poor efficiency if it were to operate under light-load conditions. Digital compensator 210 is part of the control loop and is clocked at high speeds using the $F_{SYS}$ clock signal for fast computation, but it adds power. The trigger ramp signal is also clocked at high speeds and adds power. The loop compensation is updated at the full sample rate, which adds complexity, but the loop latency also increases with a reduction in the sampling rate, which would increase the risk of loop instability.

Figure 8:
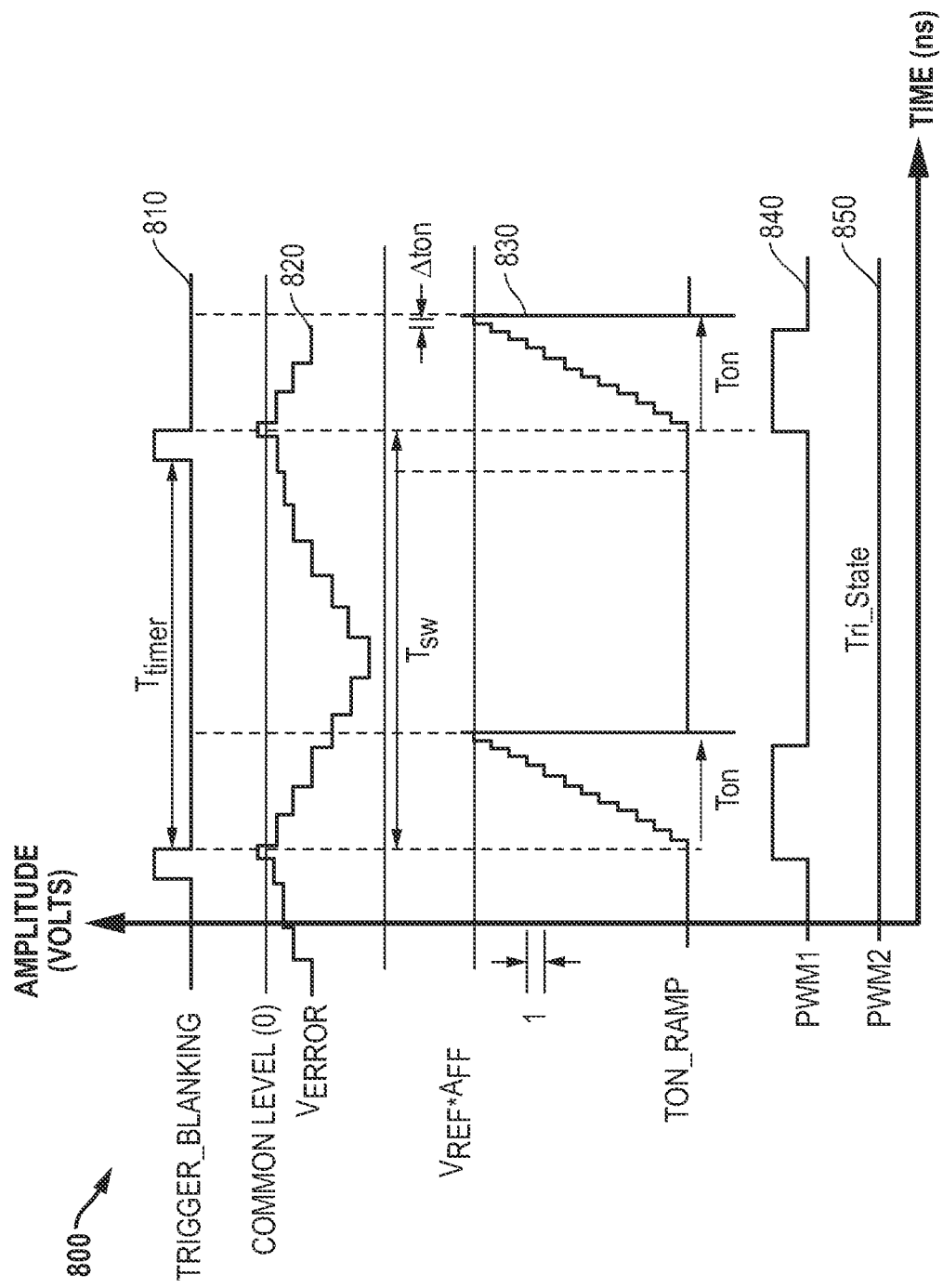
FIG. 8 illustrates another timing diagram showing the operation of the digital constant on-time/green mode controller of the multi-phase power converter of FIG. 1.

FIG. 8 illustrates another timing diagram 800 showing the operation of digital constant on-time/green mode controller 130 of multi-phase power converter 100 of FIG. 1. In timing diagram 800, the horizontal axis shows time in nanoseconds (ns), and the vertical axis shows the amplitude of various signals in volts. Shown in FIG. 8 are waveforms of five signals of interest, including a waveform 810 showing the TRIG_BLANKING signal, a waveform 820 showing the $V_{ERROR}$ signal, a waveform 830 showing the TON_RAMP signal, a waveform 840 showing the PWM signal provided from driver 141 to power stage 151, and a waveform 850 showing the PWM signal provided from driver 142 to power stage 152.

Timing diagram 800 shows the condition in which multi-phase power converter 100 is operating in the green mode, corresponding to state 610. In this state, the TRIGGER_RAMP is swapped with trigger blanking to avoid output DC offset and reduced jitter by rejecting noise and false triggers. Driver 141 is set by the $V_{ERROR}$ common mode zero ($V_{ERROR}$=Common Level (0)) inception, and multi-phase power converter 100 provides the $V_{ERROR}$ signal to lowpass filter 310. Lowpass filter 310 provides the filtered $V_{ERROR}$ signal, which includes a droop component. It uses the TON_RAMP signal for trailing edge modulation, and resets PWM1 by the TON_RAMP inception with a threshold voltage, i.e., the $V_{REF}*A_{FF}$ level. In this mode, switching can occur in either discontinuous conduction mode (DCM) or continuous conduction mode (CCM). The green mode avoids the use of any compensator, e.g., digital compensator 210, by the activation of the 1Ph signal. In this case, digital compensator 210 is held in reset and $V_{comp}$=0, saving power. In addition, in green mode, loop latency can increase by dropping the sampling rate without impacting stability.

The above-disclosed subject matter is to be considered illustrative, and not restrictive, and the appended claims are intended to cover all such modifications, enhancements, and other embodiments that fall within the scope of the claims. For example, while the disclosed multi-phase power converter had two phases, the technique can be expanded to an arbitrary number of phases greater than two. In this case, one of the phases will remain conductive in the green mode. Also while exemplary embodiments of the digital ramp pulse modulator, the digital constant on time modulator, error signal generator, and the clock generator and mode controller were shown, in other embodiments, other suitable circuits can be used. In the disclosed embodiment, some but not all of the digital ramp pulse modulator was disabled in green mode, but in other embodiments, different circuits can also be disabled in green mode for power savings.

Thus, to the maximum extent allowed by law, the scope of the present invention is to be determined by the broadest permissible interpretation of the following claims and their equivalents, and shall not be restricted or limited by the forgoing detailed description.

What is claimed is:

1. A multi-phase power converter, comprising:
    a digital ramp pulse modulation controller for providing a plurality of trigger ramp signals in response to an error signal when the multi-phase power converter is not in a green mode, wherein at least a portion of said digital ramp pulse modulation controller is inactive in the green mode;
    a digital constant on-time controller for providing on-time thresholds and off-time thresholds when the multi-phase power converter is in the green mode; and
    a driver stage that provides a plurality of drive signals to a corresponding plurality of power stages in response to corresponding trigger ramp signals when the multi-phase power converter is not in the green mode and in response to the on-time thresholds and the off-time thresholds when the multi-phase power converter is in the green mode.

2. The multi-phase power converter of claim 1, wherein the digital ramp pulse modulation controller comprises a digital compensator operative to perform loop compensation on the error signal that is inactive in the green mode.

3. The multi-phase power converter of claim 2, wherein:
    the digital compensator has a signal input for receiving the error signal, a reset input for receiving a green mode enable signal, a clock input for receiving a clock signal, and an output for providing a compensation signal; and
    the digital ramp pulse modulation controller further comprises:
        a modulator having an input coupled to the output of the digital compensator, a clock input for receiving the clock signal, and an output for providing the plurality of trigger ramp signals to the driver stage,
    wherein the multi-phase power converter activates the green mode enable signal and deactivates the clock signal during the green mode.

4. The multi-phase power converter of claim 1, further comprising:
    an error signal generator having a first input for receiving an output voltage generated by the driver stage, a second input for receiving monitored output current signals from each power stage of the corresponding plurality of power stages, and an output for providing the error signal in response to both the output voltage and the monitored output current signals.

5. The multi-phase power converter of claim 1, further comprising:
a control signal generator having an output for providing a green mode signal in response to detecting a light load condition.

6. The multi-phase power converter of claim 5, wherein: the control signal generator detects the light load condition in response to a zero current condition in one of the corresponding plurality of power stages.

7. The multi-phase power converter of claim 5, wherein: the control signal generator detects the light load condition in response to a discontinuous conduction mode condition in one of the corresponding plurality of power stages.

8. A multi-phase power converter, comprising:
a digital ramp pulse modulation controller for providing corresponding trigger ramp signals in response to an error signal when the multi-phase power converter is not in a green mode, wherein at least a portion of said digital ramp pulse modulation controller is inactive in the green mode;
a digital constant on-time controller for providing on-time thresholds and off-time thresholds when the multi-phase power converter is in the green mode; and
a driver stage having a plurality of drivers, each coupled to the digital ramp pulse modulation controller and to the digital constant on-time controller and providing a corresponding drive signal in response thereto; and
a power stage having a plurality of power converters coupled together and providing an output voltage, each of the plurality of power converters coupled to a corresponding driver in the driver stage and receiving the corresponding drive signal.

9. The multi-phase power converter of claim 8, wherein the digital ramp pulse modulation controller comprises a digital compensator operative to perform loop compensation on the error signal that is inactive in the green mode.

10. The multi-phase power converter of claim 9, wherein:
the digital compensator has a signal input for receiving the error signal, a reset input for receiving a green mode enable signal, a clock input for receiving a clock signal, and an output for providing a compensation signal; and
the digital ramp pulse modulation controller further comprises:
a modulator having an input coupled to the output of the digital compensator, a clock input for receiving the clock signal, and an output for providing the corresponding trigger ramp signals to the driver stage,
wherein the multi-phase power converter activates the green mode enable signal and deactivates the clock signal during the green mode.

11. The multi-phase power converter of claim 8, further comprising:
an error signal generator having a first input for receiving an output voltage generated by the power stage, a second input for receiving monitored current signals from each power stage of the plurality of power converters, and an output for providing the error signal in response to both the output voltage and a monitored output current signal.

12. The multi-phase power converter of claim 8, further comprising:
a control signal generator having an input coupled to one of the plurality of power converters, and an output for providing a green mode signal in response to detecting a light load condition.

13. The multi-phase power converter of claim 12, wherein:
the control signal generator detects the light load condition in response to detecting at least one of a zero current condition or a discontinuous conduction mode condition in one of the plurality of power converters.

14. A method for use in a multi-phase power converter having a plurality of phases, comprising:
generating an error signal in response to an output voltage of the multi-phase power converter;
activating a corresponding driver and a corresponding power stage of the plurality of phases for a duty cycle proportional to the error signal using a digital ramp pulse modulation controller;
detecting a green mode condition, and in response to detecting the green mode condition:
deactivating at least a portion of the digital ramp pulse modulation controller;
activating a digital constant on-time controller; and
activating the corresponding driver and the corresponding power stage of a predetermined one the plurality of phases in response to the error signal.

15. The method of claim 14, wherein generating the error signal comprises:
generating the error signal in response to both the output voltage and an output current of the multi-phase power converter.

16. The method of claim 14, wherein deactivating the digital ramp pulse modulation controller comprises:
deactivating a digital compensator of the digital ramp pulse modulation controller in response to the green mode condition.

17. The method of claim 16, wherein deactivating the digital ramp pulse modulation controller comprises:
stopping a clock of the digital compensator and a modulator of the digital ramp pulse modulation controller in response to the green mode condition.

18. The method of claim 14, wherein detecting the green mode condition comprises:
detecting a light load condition.

19. The method of claim 18, wherein detecting the light load condition comprises:
detecting a zero current condition in one of the plurality of phases.

20. The method of claim 18, wherein detecting the light load condition comprises:
detecting a discontinuous conduction mode condition in one of the plurality of phases.

* * * * *